United States Patent Office 3,702,218
Patented Nov. 7, 1972

3,702,218
TEMPORARY CATARACT FITTINGS
Robert G. Manhire, Box 235, Oldwick, N.J. 08858
Continuation-in-part of abandoned application Ser. No. 807,848, Mar. 17, 1969. This application Jan. 25, 1971, Ser. No. 109,595
Int. Cl. G02c 7/06
U.S. Cl. 351—167                    1 Claim

ABSTRACT OF THE DISCLOSURE

A temporary bifocal cataract fitting in which two circular plastic lenses of substantially the same diameter are removably retained within each rim of a plastic eyeglass frame, the lenses having a small but substantially uniform air space between them.

---

This application is a continuation-in-part of my copending application Ser. No. 807,848, filed Mar. 17, 1969, now abandoned.

This invention relates to a temporary bifocal cataract fitting, and a process for the preparation and use thereof. More particularly, it relates to a light weight, plastic fitting which is cosmetic in appearance and easily changed or modified as to prescription.

It is generally recognized that patients recovering from surgical removal of cataracts require a series of differing prescriptions for aphakic lenses during the course of healing until permanent lens correction can be given. Typically, as many as six different prescriptions may be required for each eye during the course of healing.

The present invention is concerned with a temporary cataract fitting which is readily adjusted as new prescriptions are required while they are used by a patient during healing. The temporary cataract fitting of the present invention is unbreakable and light in weight, preferably weighing not more than about 37 grams and desirably not more than about 35 grams when providing full, useful 42 millimeter optics, important considerations in view of the need for a dual lens system in such fittings.

Figure 1:
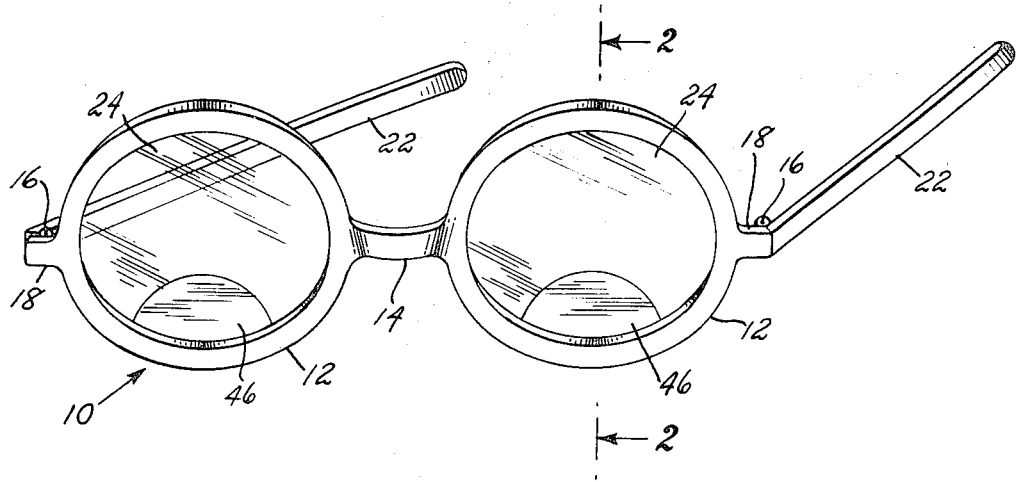
Figure 2:
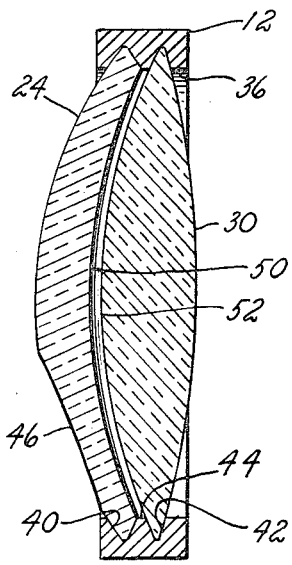

Various objects and advantages of the instant invention will become more readily apparent from the following detailed specification and claim and the attached drawing in which:

FIG. 1 is a front perspective view of a temporary cataract fitting embodying the present invention as worn by a user; and FIG. 2 is a side elevational view taken along the line 2—2 of FIG. 1.

In the drawings a frame indicated generally by reference character 10 constitutes a pair of circular rims 12 joined by bridge 14. Hinges 16 are carried on projections 18 on the outer periphery of each rim, and a substantially straight temple 22 projects rearwardly from each hinge 16. The projections 18 and the bridge 14 are in substantial alignment with the centers of the circles defined by the circular rims 12.

The rims 12 and bridge 14 are integrally molded from a resilient synthetic plastic material which expands and softens on being heated, to facilitate insertion and removal of lenses within the rims.

The rims 12 are dimensioned to accept 42-millimeter round lenses and the bridge 14, which is substantially straight, is on the order of 18 to 24 millimeters in length, to facilitate fitting the instant frames to patients wearing bandages.

As best illustrated in FIG. 2, each rim 12 is annular in shape and is provided on its internal surface 16 with dual, parallel, lens-retaining annular grooves 40 and 42.

These dual grooves are separated by a land 44, which preferably is from 0.5 to 2 millimeters thick. The grooves 40 and 42 are V-shaped and are proportioned to accept 42 millimeter round lenses.

A double convex lens 30 is disposed within the rear annular groove 42, and a concavo-convex lens 24 is retained within the front annular groove 40. The front concavo-convex lens 40 is ground with a lower bifocal segment 46 having a diameter of about 22 millimeters, and with convex surfaces extending entirely around the outer circumference of both faces of the lens to insure a tight seal with the V-groove 40.

The posterior concave face 50 of the forward bifocal lens 24 is separated from the anterior face 52 of the rear lens 30 by a uniform air space of about 1 millimeter, which spacing is determined by the dimension of the land 44 between the grooves 40 and 42. The lenses 24 and 30 are made of polymerized allyldiglycolcarbonate resin, and the radius of curvature of the posterior concave surface 50 of the front lens 24 is complementary to the radius of curvature of the anterior surface 52 of the rear lens 30. The completely assembled fitting weighs 35 grams.

The instant fittings may be prepared by stamping the frames, comprising the rims 12 and bridge 14, as a unitary, integral assembly from a sheet of cast or extruded resilient synthetic plastic material which expands and softens on being heated, milling the front annular groove 40 and the rear annular groove 42 into the interior of the rims, polishing the frames and affixing the hinges 16 and polished, straight temples 22 to the projection 18. Rear lenses 30, of the proper prescription, are then inserted, on the prescribed cylindrical axis, and then front, bifocal lenses 24, also of proper prescription, are inserted with each bifocal segment 46 disposed at the bottom of the respective rim 12.

As healing progresses and the appropriate prescription changes on almost a daily basis, the lenses 24 and 30 are changed as required by heating the rims 12 to cause them to expand and soften slightly, after which the lenses are removed and replaced with lenses of proper prescription as described above. Such heating is conventionally carried out by means of a sand bath or heated air, an expansion on the order of about 2 to 6 mils being generally sufficient to permit removal of the lenses.

Customarily there is a hiatus of approximately 2 to 3 days between surgical procedures on one eye and surgical procedures on the other eye of a patient who has cataracts. Thus, when the temporary cataract fitting is first used, the patient characteristically still has bandages on one eye, which are readily accommodated by the substantially straight temple members and the wide bridge illustrated.

At the end of the healing period when the patient receives a "permanent" prescription, the lenses 30 and 24 are removed from the rims 12 and rendered sterile and ready for further temporary use by another patient.

The use of plastic frames and plastic lenses in the instant temporary cataract fittings is highly advantageous in that it assures a fitting of light weight, typically of less than about 37 grams even when four, 42 millimeter lenses are employed, and of substantially unbreakable nature. The need for two lenses within each eye rim makes it desirable to use thin edged lenses, and thus the instant plastic lenses provide the dual benefit of lightness in weight and safety as compared to conventionally used glass lenses.

The lenses used in the fitting of the present invention are fabricated from synthetic plastic material of suitable optical clarity and index of refraction. Such plastic material is known in the art, and resins characterized by suitable properties of optical clarity, refractive index, hardness, impact strength, and form stability are generally acrylic esters, such as methylmethacrylate resins, allyl esters, e.g. allyldiglycolcarbonate, cellulose acetate of high acetyl value, and polyvinylcarbonzole.

With the exception of the hinges 16, the frames are also molded of suitable plastics exhibiting appropriate properties of tensile strength, flexibility, and thermal expansion. Typically, cellulose esters, e.g., cellulose acetate, cellulose butyrate, cellulose acetate/butyrate copolymers, and acrylic resins such as polymethylmethacrylate, may be employed for the frames.

The air space between the two lenses eliminates possible abrasive contact between these lenses during installation, replacement, and use, and also avoids possible formation of Newtonian rings, with no significant detrimental effect on the optical properties of the lens combinations. The use of round rims and round lenses permits angular rotation of the lenses as may be appropriate, e.g., for cylindrical correction by the rear lens and appropriate bifocal, spherical correction by the front lens, and also assures a fluid tight seal completely around both lenses to prevent the intrusion of fluid, dirt or dust into the space between the lenses.

As contrasted to previously proposed temporary cataract sets in which a small bifocal spherical glass spot is cemented to a large glass carrier lens, which may require a day or longer to prepare, during which period a patient's correct prescription may have changed as a result of healing progress, the temporary cataract set of the instant invention may be prepared or modified in prescription in a matter of a few minutes. In addition, the instant temporary fitting is also lighter in weight, more esthetic in appearance, free of optical cement, and gives the patient a larger useful field of view.

What is claimed is:

1. A temporary bifocal cataract fitting which comprises a pair of rims connected by a bridge, said rims and bridge being integrally molded of resilient synthetic plastic material which expands on being heated, each rim defining an internal round opening having on its inner surface dual parallel, anterior and posterior annular lens-retaining V-shaped grooves; a substantially straight bridge of from 18 to 24 millimeters length between said rims; an anterior bifocal lens of polymerized transparent synthetic plastic material removably retained in a fluid-tight seal within said anterior annular groove, a posterior cylinder-correcting lens of polymerized transparent synthetic plastic material removably retained in a fluid-tight seal within said posterior groove, said posterior lens and said anterior lens being about 42 millimeters in diameter and having convex surfaces extending entirely around the outer circumference thereof; the proximate surfaces of said lenses being of complementary radii of curvature and being spaced apart from each other about one millimeter by an annular land about 0.5 to 2 millimeters wide disposed between said parallel, dual, lens-retaining grooves; a hinge-carrying projection on the outer periphery of each rim, said projections and said bridge being in alignment with each other and with the centers of said round openings; and a substantially straight synthetic plastic temple projecting rearwardly from each such hinge, said temporary cataract fitting weighing not more than about 37 grams.

References Cited

UNITED STATES PATENTS

| | | | |
|---|---|---|---|
| 1,685,725 | 9/1928 | Rowe | 351—54 |
| 1,230,136 | 6/1917 | Draper | 351—154 |
| 3,195,145 | 7/1965 | Tisher et al. | 351—167 X |
| 3,380,718 | 4/1968 | Neefe | 351—177 X |

FOREIGN PATENTS

| | | | |
|---|---|---|---|
| 757,055 | 10/1933 | France | 351—47 |

OTHER REFERENCES

Vision-Ease advertisement in Optometric Weekly, Apr. 8, 1965, p. 20 cited.

Fenton, article in Transactions of the Ophthalmological Societies, 1968, cover sheet and pp. 451–460 cited.

DAVID H. RUBIN, Primary Examiner

U.S. Cl. X.R.

351—83, 154, 168, 176